March 13, 1962
H. W. VOLBERG
3,025,342
SYSTEM FOR GENERATING WAVEFORMS UTILIZING DRIFT OF CARRIERS
Filed Aug. 4, 1958
2 Sheets-Sheet 1
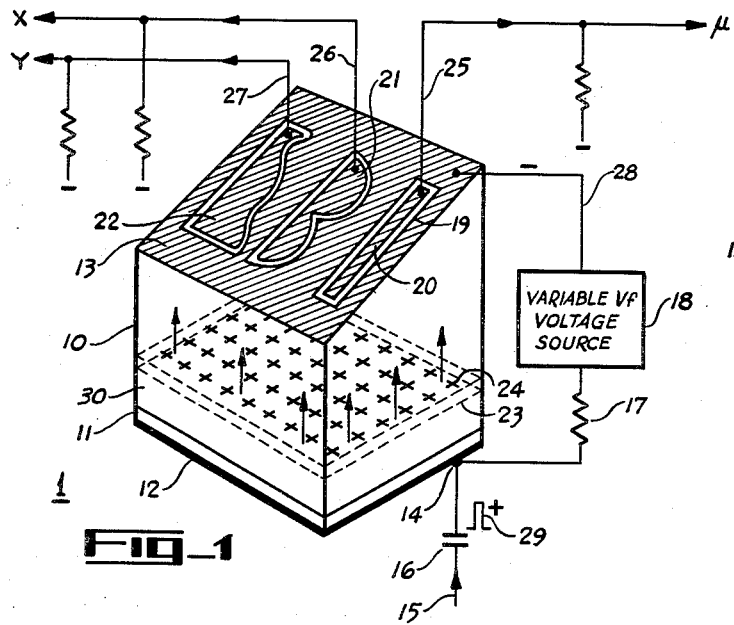
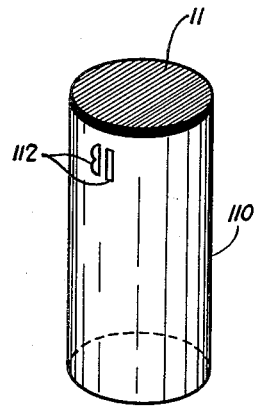
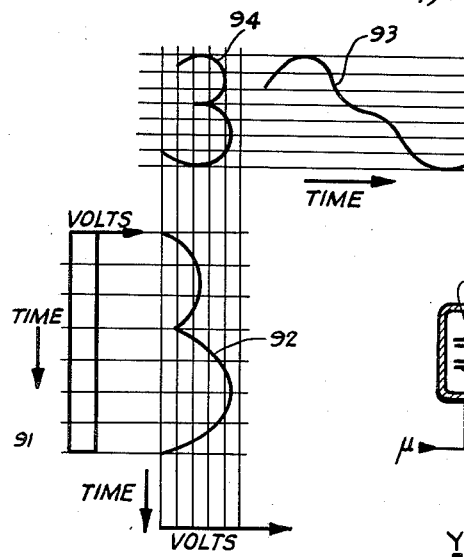
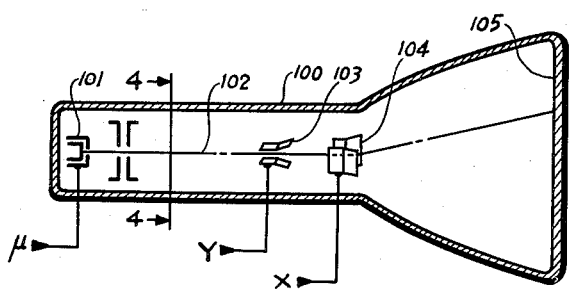
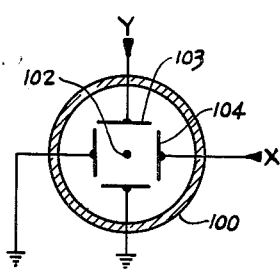
INVENTOR.
HERMAN W. VOLBERG
BY Carl R. Brown

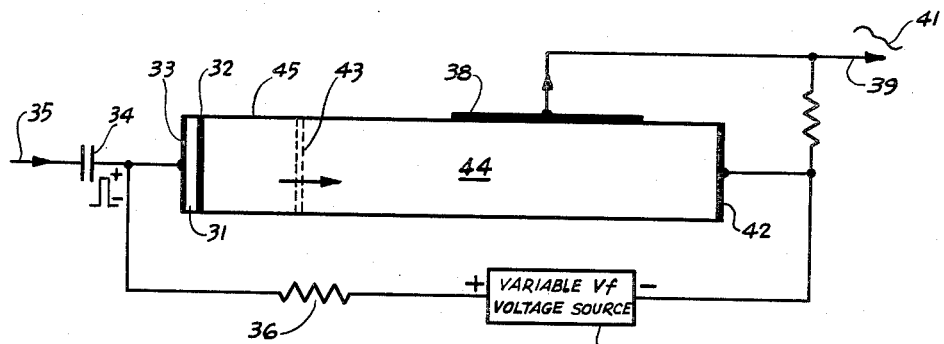
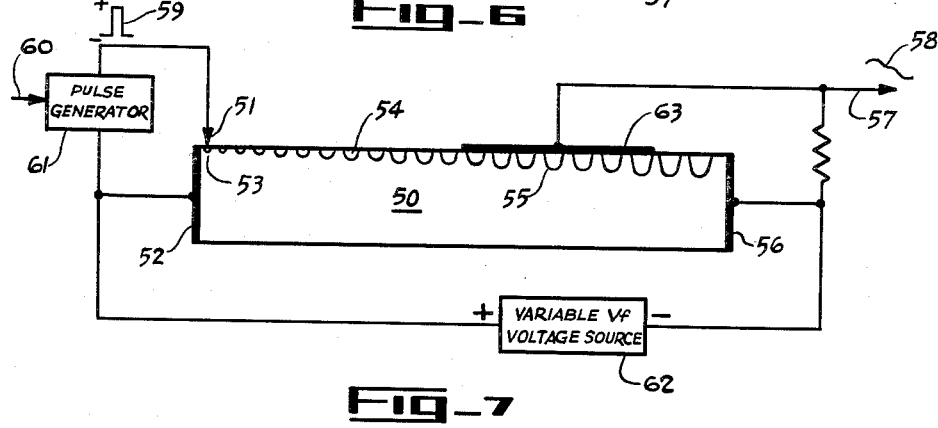
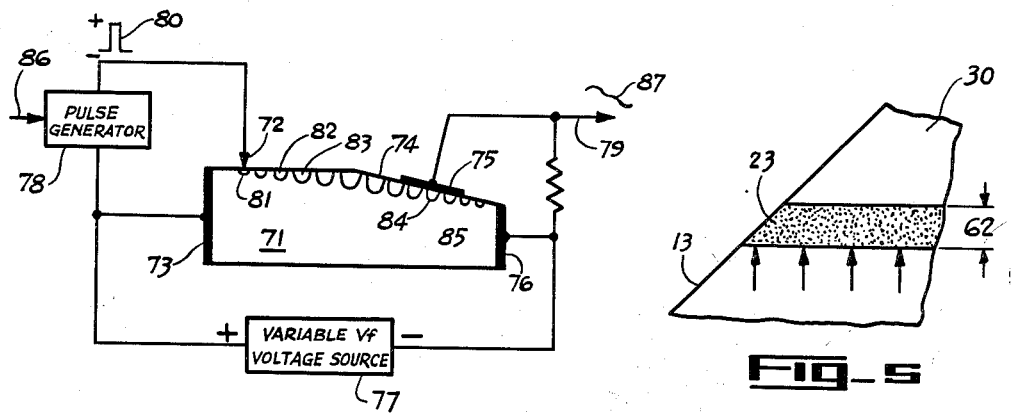
INVENTOR.
HERMAN W. VOLBERG.

United States Patent Office 3,025,342
Patented Mar. 13, 1962

3,025,342
SYSTEM FOR GENERATING WAVEFORMS
UTILIZING DRIFT OF CARRIERS
Herman W. Volberg, San Diego, Calif., assignor to General Dynamics Corporation, Rochester, N.Y., a corporation of Delaware
Filed Aug. 4, 1958, Ser. No. 753,031
17 Claims. (Cl. 178—5)

The present invention relates to a system for generating waveforms and more particularly, to a system for generating waveforms including a semi-conductor waveform generator capable of providing predetermined output waveforms in connection with appropriate accompanying circuitry.

To generate waveforms of voltage or current having a predetermined configuration, either singly or several waveforms at any one instant, generally requires a large number of electrical components. To obtain a desired unconventional waveform configuration, the practice is to take any one unit of components capable of generating a particular wave shape and combining or marrying several of these components into an integrated unit which is then capable of generating the desired unconventionally configurated waveform. This involves an integration of the units both time-wise and waveform-wise resulting in a large number of electrical components and a considerable amount of complicated circuit design. It is therefore obvious that to build a unit capable of generating a series of predetermined configurated waveforms of the unconventional type, which unit will present these waveforms to an output circuit upon demand, requires an expensive and time-consuming operation, as well as, large unit to fabricate. Accordingly, the waveform generating devices or methods known are not entirely satisfactory because of one or more factors including their complexity, their size, their expense and the inherent unreliability involved in any circuit involving so many electrical components.

It is accordingly, an object of this invention to provide a waveform generator capable of generating any desired geometrically configurated waveform, which generator has simplicity, low cost, low power and low voltage requirements, small size, long life, and of rugged construction.

It is another object of this invention to provide a waveform generator capable of simultaneous generation of a plurality of waveforms and of time synchronization of the waveforms.

It is another object of this invention to provide a waveform generator unit generating waveforms that may be interrupted, or have their intensity modulated as desired.

It is another object of this invention to provide a waveform generator wherein only one pulse is necessary to provide various simultaneous waveform outputs.

It is another object of this invention to provide a waveform generator capable of generating waveforms wherein the shape and time length of the waveform may be selectively varied.

In accordance with the present invention, the system for generating waveforms includes a semi-conductor waveform generator. This waveform generator is capable when appropriately energized and controlled by accompanying circuitry, of generating one or more waveforms having predetermined unconventional configurations. The semi-conductor material utilized in the waveform generating unit functions substantially as a delay medium and may comprise materials capable of having current carriers therein such as N type, P type, or intrinsic type germanium, silicon or the like. The semi-conductor medium has positioned thereon shaped electrodes which have a geometrical configuration in accordance with the configuration of the desired waveform output.

When the system is in operation, a quantum of current carriers are injected into the delay material and will drift through the semi-conductor medium in a predetermined path to subsequently contact the configurated electrodes. The electrodes are so positioned on the waveform generator that their areas are successively contacted by the current carriers over a predetermined time interval. A field, established across the semi-conductor medium, causes the injected current carriers to drift towards the electrodes at an established rate of speed, which rate of speed is dependent upon the strength or energy level of the field. As the current carriers successively drift into the electrodes, varying levels of electrical energy are created or generated on the electrodes in accordance with the area of the segment of the electrode intercepted at any instant of the time interval.

The number of waveforms capable of being generated by any one unit at any one time depends upon the number of configurated electrodes placed upon the waveform generator. The shape of the electrodes may assume all sorts of geometric configurations necessary to properly accomplish the desired configuration of the output waveform. The time length of the waveform or its shape may be varied by varying the energy level of the sweeping field set up across the semi-conductor medium. The invention is capable of generating a desired geometrically configurated waveform and does so with a simple, small and low-cost device. The device also has low power requirements, long life, low voltage and is extremely rugged.

The novel features that are considered characteristic of this invention are set forth with particularity in the appended claims. The invention itself, however, both as to its organization, structure and operation, as well as additional objects and advantages thereof, will best be understood from the following description when read in connection with the accompanying drawings, in which:

FIGURE 1 is a perspective view of the present invention;

FIGURE 2 is a graphic illustration of the relationship of a plurality of waveforms generated by the invention in an example of one of its uses;

FIGURE 3 is a schematic illustration of a cathode ray tube for use in connection with the waveforms illustrated in FIGURE 2;

FIGURE 4 is a schematic cross sectional view of the cathode ray tube shown in FIGURE 3 taken along line 4—4 looking towards the screen of the tube;

FIGURE 5 is a cross sectional illustration of a portion of the invention illustrated in FIGURE 1 showing the contacting of the configurated conductors by the sheet of current carriers;

FIGURE 6 is a modification of the invention;

FIGURE 7 is an illustration of another modification of the invention;

FIGURE 8 is another modification of the invention;

FIGURE 9 is an illustration of another configuration that may be used in the invention.

Referring more particularly to the drawings in which like reference numerals refer to the same parts throughout the several views and to FIGURE 1, a representative embodiment of the system of the invention is shown having a block member 10 of semi-conductor material. The block or waveform generator 10 has a rectangular configuration with longitudinal dimension and a longitudinal axis. It has a truncated portion 13 giving an inclined surface to the upper portion that is at an angle with the flat or bottom portion 12 of the block 10. The block being of semi-conductor material, may be of either P type or N type material such as P type germanium or silicon or the like, or N type germanium or silicon or the like, or it may be of intrinsic semi-conductor material. The main property required of the materials is that they be capable of having current carriers therein which will drift as a relatively thin planar shaped sheet in response to an interrogation pulse through the medium of the block in a direction substantially parallel with the longitudinal axis in response to the sweeping field. It has been found that semi-conductor material exhibits such properties. Accordingly, it is within the scope of this invention to include all semi-conductor materials which exhibit such properties.

For the purpose of illustrating the specific embodiment of the invention, block 10 as shown in FIGURE 1 consists of N type semi-conductor material 30 which forms the major part of the block. P type semi-conductor material is attached to the bottom side thereof as shown at 11 in a manner well known in the art of joining such substances together. An ohmic contact coating covers the bottom surface 12 of the block 10. On the upper surface of the block 10, the inclined portion 13 is substantially covered with ohmic material being interrupted by the insulated configurated portions 20, 21 and 22. The configurated portions form predetermined configurated areas which are also coated with ohmic material, but which are separated from the other ohmic coated surfaces on the surface 13 in the manner shown by insulated border portions 19. These insulated border portions may consist of insulated material or air spacing between the ohmic material. Each of the configurated conductor portions 20, 21 and 22 are connected to separate output lines 25, 26 and 27. Contact 14 connected to the ohmic coating on the bottom surface of the block 12 and line 28 connected to the inclined surface 13 of the block are connected through a limiting resistor 17 to a variable voltage source $V_f$ shown at 18. The voltage source $V_f$ creates a sweeping field through the block between the inclined surface 13 and the bottom surface 12. Interrogating pulses are supplied to the block by means of line 15 through D.C. blocking capacitor 16 and may be in the form of a narrow, positive, substantially square wave 29.

The system when energized provides a configurated waveform output in substantially the manner as follows. An interrogating pulse 29 is supplied to line 15 through D.C. blocking capacitor 16 to contact 14 on the ohmic coating on the bottom of the block 12. This positive pulse when applied to the P type semi-conductive material 11 causes holes to be injected into the N type material 30, which comprises the majority portion of the block. The holes are injected into the N type material 30 in the form of a relatively thin planar sheet encompassing the entire cross-sectional area of the block as shown at 23. The thickness of the sheet of holes 23 at the point of initial injection is generally dependent upon the length of the pulse 29. Following the injection of the sheet of holes 23 into the N type material, the sheet of holes drifts in a predetermined manner toward the inclined surface 13 in response to the sweeping field created by variable voltage source 18. The speed of drift of the sheet of holes or current carriers 23 toward the inclined surface is dependent upon the strength of the field. The $V_f$ voltage source 18 includes means for varying the strength of the sweeping field, thereby permitting the time required for the sheet of current carriers to traverse the length of the semi-conductor material to be selectively varied. The sheet of current carriers 23 drift in a direction substantially perpendicular to the bottom surface 12 in response to the sweeping field while maintaining its planar relationship to the bottom surface 12. As a result, the planar sheet of current carriers 23 intersects the over-all area of the inclined surface 13 in successive time intervals, contacting the nearest portion first, and contacting the furthest portion from the bottom surface 12 last. Accordingly, the sheet of current carriers progressively contact the entire inclined surface 13 and the configurated portions 20, 21 and 22 by stages relative to time. The holes or current carriers in the sheet 23 which contacts that portion of surface 13 outside the insulated configurated portions return to voltage source $V_f$ through connecting line 28.

The current carriers successively contacting the configurated conductor portions 20, 21 and 22 create the output waveforms in their respective connecting lines. At any one instant of time during the intersection of the configurated portions by the sheet of current carriers, the magnitude of the respective output waves correspond to the energy level of the conductor portions or to the sum of the current carriers contacting the conductor portions at that instant. The magnitude of the output waveform for any instant of time is therefore substantially proportional to the size of the area of the individual conductor portions being contacted at that instant by the current carriers. Accordingly, the configurated areas of the individual conductors 20, 21 and 22 determines the magnitude of the output wave at any one instant of time. Inasmuch as the sheet contacts the conductor areas successively with time, a waveform is generated in output lines 25, 26 and 27 having a magnitude in accordance with their configurations, giving a desired output waveform corresponding thereto.

While it is an object of this invention to provide a waveform generator capable of generating waveforms for any purpose, FIGURES 1 to 4 illustrate a particular mode of use of the present invention to generate voltage waveforms capable of causing predetermined figures to be written on the screen of a cathode ray tube. The particular waveforms generated by conductors 20, 21 and 22 are designated as $u$, $x$ and $y$. The $u$ voltage waveform is the unblanking voltage, while the $x$ voltage waveform is that voltage used to control the deflection of the electron beam 102 in the cathode ray tube 100 in the horizontal direction, and the $y$ voltage waveform is used to control the deflecting of the electron beam 102 in the vertical direction. The combined $x$—$y$ voltage when supplied to electrostatic deflection plates 103 and 104 (see FIGURES 3 and 4), deflect the electron beam in a manner causing a figure 3 to be written or drawn on the screen of the tube.

FIGURE 2 illustrates diagrammatically, graphs of the respective $u$, $x$ and $y$ waveforms plotted in the relationship of time vs. voltage. The graphs are so arranged as to illustrate the manner in which the voltage waveforms control the potential on the deflection plates in the cathode ray tube 100 to draw or write a figure 3 on the screen of the tube. The cathode ray tube 100 is of a type well known in the art having an electron beam generating means 101 for generating and projecting an electron beam 102 towards the screen 105 of the tube. The unblanking voltage waveform $u$ generated in conductor 20 in FIGURE 1 is illustrated at 91 in FIGURE 2. This voltage controls the electron beam generating means 101 permitting an electron beam to be generated and projected toward the screen only when an unblanking voltage $u$ is present. The $x$ voltage waveform 92 received from conductor 21 controls the horizontal positioning of the electron beam by its variable magnitude being applied to the horizontal electrostatic deflection plates 104. The $y$ voltage waveform 93 received from conductor 22 controls the vertical positioning of the electron beam on the screen of the tube by controlling the potential on the vertical deflection plates 103. As shown in FIGURE 4, the $x$ and $y$ potentials are applied to the electrostatic deflection plates 103 and 104 causing the beam to be deflected thereby changing its direction of travel relative to the longitudinal axis of the tube within the neck of the tube 100. Accordingly, when all three waveforms are supplied to the cathode ray tube 100 in the manner aforesaid, the beam is deflected to particular positions on the screen of the tube, writing a figure 3 thereon in the shape of the figure 3 illustrated at 94 in FIGURE 2. The unblanking voltage 91 turns on the beam generating means at the start of the x and y voltage waves and shuts off the electron beam at the finish of the x and y voltages. Thus, the unblanking voltage insures that there is no continuation of the electron beam after the writing of a character on the screen. While it is obvious that if no varying control potential remained on the electrostatic plates after the x and y waveforms are terminated, then there would be no further writing influence on the beam. However, the beam generating and projecting unit is still operating, causing a spot on the screen, and unblanking voltage functions to synchronize extinguishment of the electron beam at the termination of the x and y waveforms.

The operation of the waveform generator illustrated in FIGURES 1 through 4, an interrogating pulse 29 is supplied to the ohmic coating on the bottom surface 12 of the block 10. This causes the positive pulse to be supplied to the P type semi-conductor material 11 causing a sheet of holes or current carriers 23 to be injected into N type semi-conductive material 30. The sheet of current carriers 23 drift toward inclined surface 13 intersecting the configurated conductors 20, 21 and 22 with a speed determined by the strength of the sweeping field. The particular waveforms generated by the respective conductors are supplied to output lines 25, 26 and 27 where through the respective resistors, they are converted to voltage waveforms. These waveforms are supplied to the respective control electrodes in cathode ray tube 100, causing an electron beam 102 to be generated at the start of the waveforms and to be positioned in accordance with the magnitude of the waveforms supplied to the electrostatic deflection plates 103 and 104, causing the figure 3 to be written on the screen of the tube 105.

Each individual unit 10 is capable of generating a predetermined waveform or waveforms. The number of waveforms capable of being generated by any one unit is dependent upon the number of configurated portions inscribed on surface 13. The synchronized relationship of various waveforms may be changed by changing the position of the conductor units on the inclined surface. The shape of the waveforms may also be varied by varying the magnitude of the sweeping field, thus increasing or decreasing the speed of drift of the sheet of current carriers 23 and thereby altering the time interval required for the current carriers to contact the entire surface of the configurated conductor areas.

FIGURE 5 illustrates schematically the intersection of the inclined surface 13 by the planar sheet of current carriers 23. At the point of initial injection of the sheet of current carriers 23 into the main portion of the semi-conductive material 30, the sheet of current carriers has a narrower width 62 than is present at the point of contact with the inclined surface 13. As the current carriers drift upwardly toward the inclined surface, they have a tendency to diffuse at a pre-determined rate. This diffusion tends to increase the width 62 of the sheet of current carriers 23. The width 62 of the sheet of current carriers 23 determines to a certain extent, the definiteness of the waveforms generated in the respective configurated conductors. If the width 62 of the sheet of current carriers 23 is large, then accordingly, the ability of the sheet of current carriers 23 to follow the minute configurations of the configurated conductors is reduced. It has been found that by varying the geometry of the configurations, or the length of the semi-conductor block, a desired output waveform of any configuration may be obtained.

The semi-conductive material utilized in all the embodiments of the invention may be of N type, P type or intrinsic type semi-conductive material. Where N type or P type semi-conductive material is used, it is desirable that the doping of the donor or acceptor impurities be light, to thereby reduce the loss of free current carriers in the sheet of current carriers during their travel through the semi-conductive material and to provide a necessary voltage gradient to establish a sweeping field. In using N type material for the majority portion of the semi-conductor block, the current carriers will then be holes, while if P type material is used for the majority portion, the current carriers will be electrons. The ohmic coated surfaces used on the semi-conductive material, generally serves to collect the current carriers. Accordingly, any appropriate current collecting surface may be used therefor.

FIGURE 6 illustrates a modification of the invention wherein the delay material 44 is in the form of a rectangular block without an inclined portion 13 as shown in FIGURE 1. The semi-conductor material in this modification may be of N type, P type or intrinsic type semi-conductive material. For the purposes of the specific embodiment, N type was used. In operation, an interrogating pulse is supplied to line 35 through D.C. blocking capacitor 34 providing a substantially square positive interrogation pulse of short length. The interrogating pulse contacts the P type semi-conductive material 31 evenly through ohmic coating 33. The P type material 31 is joined to the N type semi-conductive material 44 through a planar connection 32 of a known type. In response to the interrogation pulse, a sheet of current carriers, which, in this instance are holes 43, are injected into the N type material 44. The sheet of holes 43 drift through the delay material 44 toward the ohmic coating 42 in response to the sweeping field established by the variable $V_f$ voltage supply 37 through current limiting resistor 36. In this embodiment, the configurated conductor portions 38 are placed on the upper flat surface 45 of the rectangular shaped semi-conductor material 44. The conductor portions 38 are inscribed on the surface 45 having any desired configuration such as the configuration illustrated in FIGURE 1 with the enclosed conductor portions having an ohmic coating. The surface outside the enclosed ohmic-coated configurated conductive portions need not have any particular coating, inasmuch as the negative terminal of the sweeping field at 42 causes the sheet of current carriers to drift through the entire length of the semi-conductor 44. As the sheet of current carriers 43 drifts toward the ohmic coating 42 at a rate of speed established by the strength of the sweeping field, the sheet of current carriers successively contact the conductors 38. Accordingly, a waveform having a magnitude dependent upon the configuration of the conductor 38 is generated in output line 39. The ohmic contact of the sweeping field absorbs the excess current carriers that eventually reach the ohmic coating 42. Therefore, a waveform having a configuration such as shown at 41 or any desired configuration, is supplied to the output line or lines 39.

With respect to FIGURE 7, an embodiment of the invention is shown wherein a point contact is used for injecting pockets of current carriers into the rectangular shaped semi-conductor block 50. In this embodiment, the material is again of the N type semi-conductive material, however, as aforesaid, it may be of P type or intrinsic semi-conductor material. Input pulses are supplied to line 60 which controls a pulse generator for generating a substantially square positive pulse 59 which, when supplied to point contact 51, causes holes 53 to be injected into the N type semi-conductive material 50. Any type of pulse generating means may be used to supply an interrogating pulse to point contact 51. The holes 53 drift toward the other end of the conductor 50 in response to the sweeping field created by the voltage source 62. The configurated conductor portions 63 are placed on the upper surface of the semi-conductor material 50 in the manner stated with respect to FIGURE 6. As the holes drift toward the ohmic coating 56, they serially intersect the configurated portions of the conductor 63, giving the desired waveform output 58 to output line or lines 57. As the holes 53 drift toward the ohmic coating 56, they tend to diffuse through the delay material 50 in a predetermined manner. Accordingly, the volume occupied by the holes at points 54 and 55 are progressively larger than the volume occupied by the holes 53 injected by point contact 51, as shown. The conductor portions are so configured as to allow for the increase in the size of the volume occupied by the holes in the manner stated with respect to FIGURE 5 to provide the desired configurated output wave 58.

FIGURE 8 illustrates another modification of the invention utilizing a point contact 72 for injecting current carriers into the semi-conductor block 71. The semi-conductor block 71 may take the form of a rectangular bar having an inclined portion 74 thereon. Ohmic coatings 73 and 76 provide positive and negative contacts for the sweeping field supplied by variable voltage source 77. In this modification, the material may also be of N type, P type or intrinsic type semi-conductor material. For purposes of exemplifying this embodiment, the N type material is used. An input pulse is supplied to line 86 causing the pulse generator 78 to provide a positive, substantially square wave pulse 80 to point contact 72. Point contact 72 injects holes into the media 71. The pocket of current carriers 81 drift toward the ohmic contact 76 in response to the sweeping field. As the sweeping field draws the pocket of current carriers 81 toward the ohmic contact 76, the current carriers drift into the configurated conductors or electrodes 75 positioned on the inclined surface 74 providing an output waveform in line or lines 79 in the manner stated with respect to FIGURE 1. The successive volumes occupied by the current carriers shown in FIGURE 8 and identified as 82, 83, 84 and 85, identifies successive stages of the pocket of current carriers injected by point contact 72. As the pocket of current carriers drift toward the ohmic coating 76, they tend to become larger by a predetermined amount because of diffusion. The pocket of current carriers 81 through 85 tend to follow a path toward the ohmic contact 76 in response to the sweeping field. As they reach the inclined portion, they then intersect with the configurated current carriers in the manner aforesaid, providing the output waveform. In this embodiment, the ohmic coating 76 may also extend over the inclined surface 74 enclosing the configurated portions in a manner illustrated in FIGURE 1, or, the conductor portions may be placed on the surface of the media 71 in the manner stated with respect to FIGURES 6 and 7. If placed in the manner of FIGURES 6 and 7, the surrounding surface of the delay media 71 on the inclined portion 74 may be roughed to kill the current carriers on contact.

While the shape of the delay medium or semi-conductive material in the specific embodiment is illustrated as generally following a square or rectangular shape, the length of the member may also have a circular configuration or a cylindrical shape with the conductor portions laid out on the side of the member as shown in FIGURE 9. Also, other obvious shapes of the semi-conductor material may also be utilized, and still be within the purview of the invention.

The particular embodiments of the invention illustrated and described herein are illustrative only and the invention includes such other modifications and equivalents as may readily appear to those skilled in the art, within the scope of the appended claims.

I claim:

1. A waveform generating system having in combination configurated conductor areas for collecting current carriers and creating waveforms having a particular configuration substantially proportional with the areas of successive segments of said conductor areas, means for generating and for projecting a sheet of current carriers in a path toward said conductors, semi-conductor means positioned between said generating means and said conductor areas for facilitating a delayed movement of said current carriers in said path, said projecting means including an energy field through said semi-conductor means for variably controlling the speed of movement of said current carriers in said path, said conductor areas being fixed to said semi-conductor means and being positioned in a plane at an angle to said path of said current carriers thereby permitting said successive segments to successively in time intercept said current carriers, and said waveforms being generated in said conductors.

2. A waveform generating system comprising in combination a waveform generator including a semi-conductor medium having a longitudinal dimension, means for momentarily injecting a quantum of current carriers into said medium at one end thereof, sweeping field means connected to ohmic contact means on respective ends of said medium for causing said quantum of current carriers to drift as a plane in a direction substantially parallel to said longitudinal dimension, configurated conductor areas having ohmic surfaces for collecting current carriers on the other end of said medium in a plane positioned at an angle with the path of said current carriers, said conductor areas intercepting portions of said quantum of current carriers successively with time, each of said conductor areas being insulated from the others and having a particular area corresponding with the configuration of the desired output wave, output lines connected to each of said conductors being responsive to the energy magnitude in each of said areas, waveforms being generated in said conductor areas and supplied to said output lines having magnitudes that vary in time in a manner proportional to the particular segment of said configurated areas successively intercepting said quantum of current carriers.

3. A waveform generating system comprising in combination conductors having configurated areas for creating waveforms, means for generating and projecting a sheet of current carriers in a path toward said conductors, semi-conductor means positioned between said generating means and said conductors for controlling the speed of movement of said sheet of current carriers in said path, said areas of said conductors being arranged to intercept said sheet of current carriers in successive stages providing output waveforms having magnitudes that vary with the immediate area of the segment of the conductor intercepting said sheet in each of said stages.

4. A waveform generating system including a semi-conductor medium having a light doping of impurities therein, means for momentarily injecting a quantum of current carriers into said medium, sweeping field means for causing said current carriers to drift through said medium, configurated conductor areas positioned on said medium in spaced relationship from said injecting means for successively intercepting and collecting a portion of said current carriers, said configurated conductor areas being substantially surrounded by, but insulated from an ohmic surface, said surrounding ohmic surface having an electrical connection to said field means, and energy waveforms capable of being generated in said conductor areas in response to said areas successively intercepting said current carriers.

5. A waveform generating system comprising lightly doped P type semi-conductive material having a longitudinal dimension and a longitudinal axis, N-type semi-conductive material joined to one end of said longitudinal dimension and having an ohmic surface on its opposite side, means for supplying a negative pulse of substantially a square wave to said N-type semi-conductive material through said ohmic surface causing a sheet of electrons to be injected into said P type semi-conductive material, sweeping field means for causing said sheet of electrons to drift through said P type semi-conductive material in a direction substantially parallel to said longitudinal axis, configurated conductor areas for collecting electrons being positioned on said P type semi-conductive material in spaced relation from said N type material in a manner to successively in time intercept said sheet of electrons, waveforms being generated in said conductors having a configuration corresponding to the area of the segments of said conductor areas being successively in time intercepted by said sheet of electrons, and output lines being responsive to changes in the energy level of said conductors.

6. A waveform generating system comprising lightly doped N type semi-conductive material having a longitudinal dimension and a longitudinal axis, P type semi-conductive material joined to one end of said longitudinal dimension and having an ohmic surface on its opposite side, means for supplying a positive pulse of substantially a square wave to said P type semi-conductive material through said ohmic surface causing a sheet of holes to be injected into said N type semi-conductive material, sweeping field means for causing said sheet of holes to drift through said N type semi-conductive material in a direction substantially parallel to said longitudinal axis maintaining a planar relationship normal to said longitudinal axis, configurated conductor areas having ohmic surfaces being positioned on said N type semi-conductive material in spaced relation from said P type material in a manner to successively in time intercept said sheet of holes, waveforms being generated in said conductors having a configuration corresponding to the area of the segments of said conductor areas being successively in time intercepted by said sheet of holes, and output lines being responsive to changes in the energy level of said conductors.

7. A waveform generating system having configurated conductor areas for creating waveforms having a particular configuration corresponding with the area of segments of said conductors, means for generating and for projecting a quantam of current carriers in a path toward said conductors, semi-conductor means positioned between said generating means and said conductor areas for facilitating a delayed movement of said current carriers in said path, said conductor areas being fixed to said semi-conductor means in a plane perpendicular to said path of said current carriers, said projecting means including an energy field through said semi-conductor means for variably controlling the speed of movement of said current carriers in said path, output waveforms being generated in said conductors having instantaneous magnitudes that vary with the area of said segments of said conductors contacted by said current carriers.

8. A waveform generating system including configurated conductor areas for creating configurated waveforms, means for generating and projecting a pocket of current carriers in a path toward said conductors, semi-conductor means positioned between said generating means and said conductors for controlling the speed of movement of said pocket of current carriers in said path, said configurated conductor areas being arranged to intercept said pocket of current carriers in successive stages providing output waveforms having magnitudes that vary with the area of the immediate portion of the configurated conductors contacting said pocket of current carriers in each of said stages.

9. A waveform generating system including configurated conductor areas for creating configurated waveforms, means for generating and projecting a sheet of current carriers in a path toward said conductors, semi-conductor means positioned between said generating means and said conductors for controlling the speed of movement of said current carriers in said path, said configurated conductor areas being arranged in a plane normal to said path in a manner to intercept said current carriers in successive stages providing output waveforms having magnitudes that vary with the area of the immediate portion of the configurated conductor intercepting said current carriers in each of said stages.

10. A waveform generating system including configurated conductor areas for creating configurated waveforms, means for generating and projecting a pocket of current carriers in a path toward said conductors, semi-conductor means positioned between said generating means and said conductors for controlling the speed of movement of said pocket of current carriers in said path, said configurated conductor areas being arranged in a plane positioned at an angle less than 90 degrees to said path in a manner to intercept said pocket of current carriers in successive stages providing output waveforms having magnitudes that vary with the area of the immediate portion of the configurated conductors contacting said pocket of current carriers in each of said stages.

11. In a waveform generating system, a waveform generator comprising a body of semi-conductor material, said body including a P type region and an N type region joined together, the portion of said body comprising one of said regions being larger than that of the other of said regions, said larger region having a light doping of impurities therein and having positioned thereon at least one electrode having a configurated area for collecting current carriers, areas of segments of said area of said electrode corresponding to the desired output configuration of the waveform, means at opposite ends of said body for receiving and passing through said body a field potential and means capable of injecting current carriers into said larger region from said other region.

12. A waveform generating system comprising in combination a semi-conductor medium, means for injecting current carriers into said medium, electrode means having given configurated areas positioned on said medium for successively intercepting and collecting said current carriers, said electrode means having successive current magnitudes created therein in response to successively intercepting said current carriers, and the magnitudes of said currents being proportional to the successive areas of said electrodes intercepting said current carriers.

13. A waveform generating system including in combination a semi-conductor medium having a light doping of impurities therein, means for momentarily injecting a quantum of current carriers into said medium, sweeping field means for causing said current carriers to drift through said medium, configurated conductor portions each having individually configurated areas positioned on said medium for successively intercepting and collecting portions of said current carriers, said current carriers being caused to drift into successive contact with said configurated areas of said conductor portions in response to said sweeping field, varying levels of electrical energy being created on said conductors in accordance with the area of the segment of the conductor intercepted.

14. A waveform generating system having in combination configurated conductor areas for creating waveforms having a particular configuration corresponding with said configurated areas, means for generating and for projecting current carriers in a path toward said conductors, semi-conductor means positioned between said generating means and said conductor areas for facilitating a delayed movement of said current carriers in said path, said projecting means including an energy field through said semi-conductor means for variably controlling the speed of movement of said current carriers in said path, said conductor areas being positioned in a manner that segments thereof successively in time intercept and collect portions of said current carriers, and output waveforms having instantaneous magnitudes that vary with the segment of the configurated area of said conductors intercepted by said current carriers.

15. A waveform generating system comprising a semi-conductor medium, at least one electrode having a distinct configurated area positioned on said medium, the configuration of said area being related to a particular desired character formation, input energizing means for causing current carriers to move through said medium, said electrode successively collecting said current carriers over a predetermined time interval to provide an output signal at said electrode the waveform of which depends upon the configuration of said electrode.

16. A waveform generating system as set forth in claim 15 including means for producing a variable field through said medium for varying the time required for said current carriers to traverse said medium.

17. A waveform generating system comprising a semiconductor medium, first, second and third electrodes each having a distinct configurated area positioned on said medium, the configuration of the first and second of said areas being related to a particular desired character formation, input energizing means for causing current carriers to traverse said medium, each of said electrodes successively collecting said current carriers over a predetermined time interval to provide output signals at said corresponding electrodes, the waveform of said output signals from said first and second electrodes depending upon the configuration of said corresponding electrode, and the output signal from said third electrode existing only during the presence of output signals from said first and second electrodes.

References Cited in the file of this patent

UNITED STATES PATENTS

| | | |
|---|---|---|
| 2,438,709 | Labin | Mar. 30, 1948 |
| 2,502,479 | Person et al. | Apr. 4, 1950 |
| 2,600,500 | Haynes et al. | June 17, 1952 |
| 2,632,146 | Kock | Mar. 17, 1953 |
| 2,701,302 | Giocoletto | Feb. 1, 1955 |
| 2,717,342 | Pfann | Sept. 6, 1955 |
| 2,761,020 | Shockley | Aug. 28, 1956 |
| 2,766,444 | Scheftelman | Oct. 6, 1956 |

OTHER REFERENCES

Barden: "Theory of Relation Between Hole Concentration and Characteristics of Germanium Point Contacts," October 1950 of the Bell System Technical Journal, pages 469–495.